US008228990B2

(12) United States Patent
Visharam et al.

(10) Patent No.: US 8,228,990 B2
(45) Date of Patent: Jul. 24, 2012

(54) TEMPLATE MATCHING SCHEME USING MULTIPLE PREDICTORS AS CANDIDATES FOR INTRA-PREDICTION

(75) Inventors: Mohammed Zubair Visharam, Santa Clara, CA (US); Mohammed Gharavi-Alkhansari, Santa Clara, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 926 days.

(21) Appl. No.: 12/268,307

(22) Filed: Nov. 10, 2008

(65) Prior Publication Data

US 2009/0180538 A1 Jul. 16, 2009

Related U.S. Application Data

(60) Provisional application No. 61/011,443, filed on Jan. 16, 2008.

(51) Int. Cl.
*H04N 7/12* (2006.01)
(52) U.S. Cl. .................................. 375/240.15
(58) Field of Classification Search .................... 375/240
See application file for complete search history.

(56) References Cited

U.S. PATENT DOCUMENTS

| | | | |
|---|---|---|---|
| 5,267,334 A * | 11/1993 | Normille et al. | 382/236 |
| 6,289,052 B1 | 9/2001 | Faryar et al. | |
| 6,356,654 B1 | 3/2002 | Loce et al. | |
| 6,584,224 B2 | 6/2003 | Sun et al. | |
| 2009/0003443 A1* | 1/2009 | Guo et al. | 375/240.13 |

FOREIGN PATENT DOCUMENTS

| | | |
|---|---|---|
| EP | 1679902 A2 | 7/2006 |
| WO | 2005043882 A2 | 5/2005 |

OTHER PUBLICATIONS

T.K. Tan et al. Intra Prediction by Averaged Template Matching Predictors. 4th IEEE Consumer Communications and Networking Conference (CCNC), Jan. 2007, pp. 405-409.
Y. Suzuki et al. Inter Frame Coding with Template Matching Averaging. IEEE International Conference on Image Processing (ICIP), Sep. 16, 2007, pp. 409-412.

(Continued)

*Primary Examiner* — Gilberto Barron, Jr.
*Assistant Examiner* — Virginia T Ho
(74) *Attorney, Agent, or Firm* — John P. O'Banion

(57) ABSTRACT

An apparatus and method for spatial encoding of intra-predictions for a current block of a video sequence without the need to average across a number of best template matches. The encoder identifies and sorts the best template matches for the current block within previously coded and reconstructed blocks which neighbor the current block of video. In response to determining actual predictive error for the sorted list of matches, a selector is generated identifying which of the sorted templates is optimal. The selector is then communicated for receipt by the decoder, which is adapted for performing the same template matching and sorting, which is followed by selection of the optimum candidate in response to using the selector. In response to the selector information the decoder can provide optimum template matching without the compromise or overhead of taking averages across the best template candidates.

20 Claims, 5 Drawing Sheets

OTHER PUBLICATIONS

N. Rodrigues et al. Multiscale Recurrent Pattern Predictive Image Coding with Template Matching. Proceedings of the 6th. Conference on Telecommunications (Conftele 2007), Recife, Brazil, vol. 3, pp. 14-18, May 9-11, 2007.

L. Deng et al. An Efficient Hardware Implementation for Motion Estimation of AVC Standard. IEEE Transactions on Consumer Electronics, vol. 51, No. 4, Nov. 2005, pp. 1360-1366.

N. Rodrigues et al. Improving H.264/AVC Inter Compression with Multiscale Recurrent Patterns. Proceedings of the IEEE International Conference on Image Processing (ICIP), pp. 1353-1356 (2006).

G. Sullivan et al. The H.264/AVC Advanced Video Coding Standard: Overview and Introduction to the Fidelity Range Extensions. Presented at the SPIE Conference on Application of Digital Image Processing XXVII, Special Session on Advances in the New Emerging Standard: H.264/AVC, Aug. 2004.

* cited by examiner

TEMPLATE MATCHING SCHEME USING MULTIPLE PREDICTORS AS CANDIDATES FOR INTRA-PREDICTION

CROSS-REFERENCE TO RELATED APPLICATIONS

This application claims priority from U.S. provisional application Ser. No. 61/011,443 filed on Jan. 16, 2008, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to video coding, and more particularly to exploitation of spatial correlation during intra-prediction for block-based image/video compression.

2. Description of Related Art

With the proliferation of visual media, the use of video and image compression has never been more important. It will be appreciated that numerous approaches are used separately or in combination toward increasing video and image compression without loss of quality or introduction of artifacts.

Compression based on inter-picture prediction (shortened simply to "inter-prediction") attempts to eliminate temporal (time-wise) redundancy between frames of a video. In these predictions motion vectors are used for selecting predictors from prior or future image frames. By contrast, compression based on intra-picture prediction (shortened simply to "intra-prediction") attempts to eliminate spatial (area-wise) redundancy within the same frame of an image, or video comprising a sequence of images. In video compression standards like H.264 both inter- and intra-predictions are utilized toward reducing or eliminating both forms of redundancy.

Compression standards such as H.264/AVC have included the use of spatial prediction blocks/pixel values, wherein spatial correlation is exploited with characteristics of the pixel neighborhood used to select a predictor. As with any prediction scheme, the use of prediction blocks reduces data rate because only the differences (often referred to as residuals) between the real pixel values and the predicted values need to be transmitted. The use of H.264 is getting increasing attention in view of its ability to encode video with approximately 2-3 times fewer bits than comparable MPEG-2 encoders, and H.264 is about twice as efficient as MPEG-4 encoders. Partly in view of this efficiency, H.264 has recently been welcomed into the MPEG-4 standard as Part 10—Advanced Video Coding. It will be appreciated that the ability to continue lowering the bit rate while maintaining a given image quality is much sought after goal in the field of image/video compression, wherein the development of improved forms of spatial prediction are very desirable and in line with objects of the present invention.

One form of spatial prediction has utilized sample prediction blocks created in response to "attempting" to extrapolate the reconstructed pixels surrounding the target block to be coded. The sample is then subtracted from the current block to yield a residual, which is coded into the output, such as using transformation, quantization and entropy encoding. Aside from other shortcomings, the extrapolation method cannot readily predict complex textures.

Template matching techniques arose to overcome the shortcomings of the sample interpolation approach and other problematic techniques. Originally put forth for texture synthesis purposes, texture matching found its way into block-based image compression because of its predictive ability. In template matching, the value of each pixel/block in the output frame is determined by comparing its spatial neighborhood with all previously decoded neighborhoods in the frame or more preferably a search region thereof. Put another way, an area surrounding the current block which has already been coded, such as both above and to the left side of the current block, as the scan is traditionally represented, is used as a template to which other templates in the neighborhood are to be matched. The presumption of the approach being that if the pixels bordering a first block (a first template) match the pixels bordering a second block (a second template), then there is a good chance their associated blocks, first block and second block, will be reasonably similar.

It should be noted that the encoder and decoder in a template matching system are configured to perform much of the same template matching process, wherein less data needs to be sent to the decoder about the area of prediction. Since the area of the template has already been coded (both for encoder and decoder) it is known to both the encoder and decoder, thus they have a common base upon which to select the prediction. As a consequence only the residual needs to be computed in the encoder and applied within the decoder.

In one intra-prediction form of template matching, a single candidate template is found, which most closely matches the template from the current block, wherein the associated block is selected for the prediction. The decoder similarly finds this same close-match template, uses the associated block and applies the residual data obtained from the encoder/bit stream. However, this single candidate approach has the drawback in that although the pixels surrounding a block may fully match, the block itself may be substantially different than the target block currently being predicted.

In another form of intra-prediction template matching, a decoder is configured with a form of averaging of candidate matches in predicting the current block. Averaging is generally given in a form:

$$\sigma_{avg}^2 = E[X_{avg}^2] - \sigma_{avg}^2 = \frac{1}{N}\sigma^2$$

Without going into details, the above shows the averaging of N candidate blocks toward providing a better predictor than any of the blocks selected at random. It will be noted that the averaging is intended to reduce prediction error ($\sigma$) by N.

However, it should be recognized that an averaging step is required across the various templates and thus overhead is increased. In addition, it should be noted that averaging the errors is a form of compromise toward reducing maximum error. This is beneficial in considering the single candidate approach above, because although one candidate may have a huge disparity with the target block (e.g., a maximum error), the averaging with the other matches would reduce the maximum error. Unfortunately, the technique does not engender achieving predictions with minimum error; for example in cases where at least one of the templates provides a very close match with the actual current block being coded. Therefore, the use of template matching as conventionally embodied has a number of shortcomings.

Accordingly, a need exists for a system and method of video intra-prediction which has low overhead and is easy to implement in both the encoder and decoder. These needs and others are met within the present invention, which overcomes the deficiencies of previously developed intra-prediction system and methods.

BRIEF SUMMARY OF THE INVENTION

The present invention is a block-based image compression apparatus and method that uses a template matching coder and multiple predictors as candidates for intra-prediction. To exploit the spatial correlation present among the neighborhood of pixels in an image, efficient intra-prediction techniques form an important aspect for the realization of high compression efficiency in video coding. The prediction of a block is formed in response to referring to neighboring samples of previously coded and reconstructed blocks. In this invention a modified and improved version of template matching is taught which employs multiple predictors as candidates for intra-prediction and a least error selector is sent from the encoder to decoder. Intra-prediction according to the present invention can be utilized independently or alongside of current intra-prediction modes, such as within existing codecs according to the H.264/AVC standards, or similar codecs directed at eliminating spatial redundancy.

Although the method is described in reference to template matching of blocks of any desired size, it should be appreciated that the technique can be utilized down to the pixel level or up to the macroblock level without departing from the teachings of the present invention. It should also be appreciated that the block size used for luma predictions and chroma predictions will often differ and the shape of the template may also differ.

In video compression, the information transmitted from the encoder to the decoder can be generally classified as either data (e.g., residual error of the texture), or side information which carries information about the actions to be performed. In certain recent video compression technologies the decoder shares a portion of the decision making burden toward achieving improved compression. For example in current forms of template matching, the decoder performs a similar template matching process within the pixel neighborhood, so that the prediction itself need not be communicated within the compressed video bit stream. In the present invention, the decoder is then given additional information in response to the template matching process at the encoder, wherein it can make improved template matching decisions with higher precision and less overhead.

In conventional template matching methods, a single match is selected, or an average is calculated of the candidate templates at the decoder. The single match is simple, but the prediction can be subject to a high level of maximum error. In the averaging approach, the rationale for averaging is that since all candidates provide some matching to the target block, their combination would also be closer than the worst case of any of the candidates as randomly selected. The present invention, however, both eliminates the need for averaging while simultaneously providing higher accuracy, especially in response to good candidate matches.

The following terms are generally described in relation to the specification, and are not to be interpreted toward constraining specific recitations of the specification.

The term "video compression" is used herein to refer to a size reduction, in bits, of a target video, and in some cases compression of a single image, or images. It will be recognized that unlike temporal compression, spatial compression is applicable to both still and video images, although for the sake of simplicity the present invention will discuss the technique only in relation to video compression.

The term "block" as used in video compression represents a group of pixels such as in a square array, such as 2×2, 4×4, 8×8, 16×16 and so forth. These blocks may also be described as a collection of sub-block quantities or a collection of blocks otherwise described as a macroblock.

The term "macroblock" (MB) as used in video compression represents a group of pixel blocks, such as sixteen 4×4 pixel blocks, although any configurations of blocks can comprise a macroblock. Each macroblock contains pixels in each color plane, such as if a block is of 8×8 pixels, then a macroblock could contain 4 Y blocks, 1 Cb block, and 1 Cr block (4:2:0), although other configurations, including 4:2:2 or 4:4:4 YCbCr formats are common.

The term "intra-prediction" is more accurately rendered as "intra-picture prediction" and describes the elimination of spatial (space/area-wise) redundancy within each image that comprises the video sequence and is the object of improvement to which the present invention is directed.

The term "inter-prediction, or more accurately "inter-picture prediction" describes the elimination of temporal (timewise) redundancy between the frames of a video to which the present invention is equally extensible.

The invention is amenable to being embodied in a number of ways, including but not limited to the following descriptions.

One embodiment of the invention is a method of encoding intra-predictions of a current block of a current frame of a video sequence (e.g., according to H.264/AVC codec protocols), comprising: (a) identifying and sorting into an ordered list a select number (N) of spatially best matches to a matching template for the current block within previously coded and reconstructed blocks which neighbor the current block of video; (b) encoding a selector which identifies which of the templates in the ordered list provides the least actual predictive error for the current block; and (c) communicating the selector for receipt by a decoder configured for performing the same identifying and sorting step and then selecting for use the best template match in response to the selector communicated from the encoder to complete current block prediction. It should be appreciated that by creating, communicating and using the selector, the constraints of single matching and averaging are eliminated, while the decoder overhead associated with averaging of best candidates is eliminated.

In one implementation of the invention, the list of best candidates is sorted in response to the level of least residual energy for the given template, although similar template-fit characterizations can be utilized without departing from the invention. In one mode of the invention, the number (N) of candidate matches to be selected is predetermined for the encoder and decoder within a given application, and for example may be in the preferred range of from two to thirty two elements in the ordered list, with a most preferred range of from four to eight elements.

In one mode of the invention, the selector comprises a binary-coded offset into the list of best matches, and whose value is set to the position in the list of the template from which the least actual prediction error was found using the actual source block. In an alternate mode of the invention, the selector may be encoded differentially where the selector of the current block is predictively encoded using the available neighborhood selector values It should be appreciated that the selector is encoded for use with a given block of the encoded video and is thus preferably encoded into the encoded video, although it may be less preferably communicated in an alternate manner.

One embodiment of the invention is a method of encoding intra-predictions of a current block of a current frame of a video sequence, comprising: (a) identifying a select number (N) of spatially best matches to a matching template for the current block within the previously coded and reconstructed neighbors of the current block within a video input signal; (b) sorting, into a sorted list of best template matches, the best template matches having the smallest difference levels with the template associated with the current block; (c) determining actual difference between the list of best matches and actual values in current block; (d) selecting the template from within the list of best matches whose block presents a least actual predictive error; and (e) encoding a selector which identifies the least actual predictive error template as selected from within the sorted list of best template matches. It should be noted that the selector is configured for communication to a decoder which is similarly configured for identifying a select number (N) of spatially best matches to a template of the current block, ordering the best matches based on least difference, whereafter it selects for use the template with the least actual predictive error as communicated from the encoder for completing the prediction of the current block.

One embodiment of the invention is an apparatus for encoding intra-predictions of a current block of a current frame of a video sequence, comprising: (a) a computer configured for processing an incoming video signal and generating a compressed video output configured for receipt by a decoder; and (b) programming executable on the computer for, (b)(i) identifying and sorting into an ordered list a select number (N) of spatially best matches to a matching template for the current block within previously coded and reconstructed blocks which neighbor the current block of video, (b)(ii) encoding a selector which identifies which of the templates in the ordered list provides the actual least predictive error for the current block, and (b)(iii) communicating the selector for receipt by a decoder configured for performing the same identifying and sorting step and then selecting for use the best match in response to the selector communicated from the encoder to completing the current block prediction.

One embodiment of the invention is a computer-readable media containing a computer program executable on a computer configured for processing video signals and causing the computer to encode intra-predictions of a current block of a current frame of a video sequence, in response to steps, comprising: (a) identifying and sorting into an ordered list a select number (N) of spatially best matches to a matching template for the current block within previously coded and reconstructed blocks which neighbor the current block of video; (b) encoding a selector which identifies which of the templates in the ordered list provides the actual least predictive error for the current block; and (c) communicating the selector for receipt by a decoder configured for performing the same identifying and sorting step and then selecting for use the best match in response to the selector communicated from the encoder to completing current block prediction.

The present invention provides a number of beneficial aspects which can be implemented either separately or in any desired combination without departing from the present teachings.

An aspect of the invention is an intra-prediction method for use in video and image compression applications, such as codecs.

Another aspect of the invention is a method for exploiting the spatial correlation present among the neighborhood of pixels in an image.

Another aspect of the invention is an efficient intra-prediction technique for the realization of high compression efficiency in video coding.

Another aspect of the invention is a template matching scheme using multiple predictors as candidates for intra-prediction.

Another aspect of the invention is a template matching method which employs multiple predictors as candidates for intra-prediction.

Another aspect of the invention is an intra-prediction method in which receipt of a selector generated by the encoder replaces the need for selecting a single candidate or averaging of the best candidates found by the decoder.

Another aspect of the invention is an encoding and decoding method which can be utilized independently or alongside the current intra-prediction modes of H.264/AVC codec.

Another aspect of the invention is an improved template matching scheme employing multiple predictors to realize high video compression efficiency.

Another aspect of the invention is a template matching method in which residual energy is calculated between actual pixel values in the current block and the multiple sample prediction blocks from among the best matches of the templates, to obtain residual energy values by using MSE (mean square error), SAD (sum of absolute differences) or any other error criterion.

Another aspect of the invention is encoder choosing of a block that provides the least error from among the residual energy values, and communicating a simple selector directing the decoder to the associated template.

Another aspect of the invention is an intra-prediction method in which the selector passed to the decoder is an offset value, such as a binary-coded value set to the position in the list of best matches from which the least actual difference template is to be found.

Another aspect of the invention is an intra-prediction method in which the selector passed to the decoder comprises between 1 and 5 bits of information to select from a list containing between 2 and 32 elements.

Another aspect of the invention is an intra-prediction method in which the selector passed to the decoder comprises between 2 and 3 bits of information to select from a list containing between 4 and 8 elements.

Another aspect of the invention is an intra-prediction method in which the selector passed to the decoder comprises 2 bits of information to select from a list containing between 4 elements.

Another aspect of the invention is an intra-prediction method in which the selector passed to the decoder is encoded differentially.

A still further aspect of the invention is to provide a method that can be readily implemented in a variety of template matching coders.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein.

To exploit the spatial correlation present among the neighborhood of pixels in an image, efficient intra-prediction techniques form an important aspect for the realization of high compression efficiency in video coding.

Current state-of-the-art video coding systems (e.g., H.264/AVC, and similar protocols) can include block-based spatial prediction schemes. Current prediction schemes often predict pixel values for an entire macroblock from extending the edge pixels of neighboring previously decoded macroblocks. However, more attention has been turned to the use of template matching mechanisms for intra-prediction during block-based compression.

In the H.264 standard, a number of prediction modes are defined, for example in response to edge direction. Each prediction direction corresponds to a particular set of spatially-dependent linear combinations of previously decoded blocks for use as the prediction of each input block. It will be recognized that areas without texture are readily predicted, but textures and transitions can often be better predicted by following a determined edge direction in making prediction. The present invention can be utilized for block-based image compression which utilizes template matching as a single mode of prediction, or within a set of prediction modes, such as defined within H.264 for performing template matching only when it yields better predictions than those provided by the other prediction modes. It should be appreciated that the present invention is directed at an intra-prediction method that may be utilized within various compression mechanisms and in combination with various forms of inter-prediction.

Figure 1:
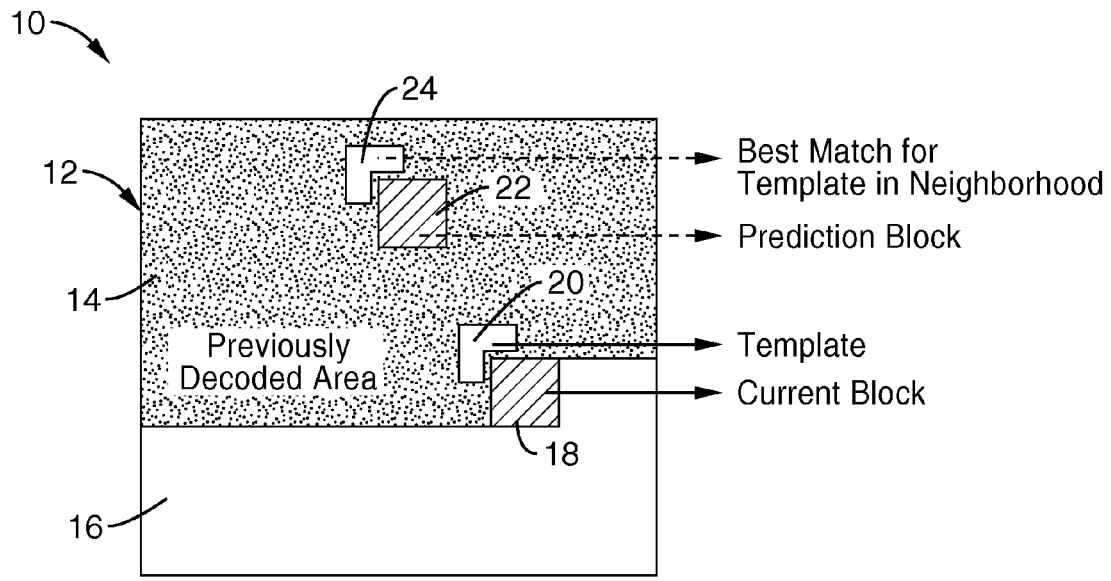
FIG. 1 is a macroblock grid showing a template for the current block being matched in the neighborhood of previously coded blocks, according to an aspect of the present invention.

FIG. 1 illustrates by way of example a schematic of a template matching method 10 which predicts the value of the current pixel/block 18 within a pixel area 12 having a reconstructed region 14 (decoded region), and non-reconstructed region 16 (uncoded or "yet-to-be-reconstructed" region). The prediction is performed by searching the reconstructed region 14 for the most similar neighborhood as compared to the neighborhood (template) 20 of the current pixel/block 18. The search is performed in decoded region 14, wherein for example template 24 may be found which closely matches template 20. Assuming some level of neighborhood correlation, it is thus assumed that block 22 may be a good match for block 18, and thus may make a suitable predictor.

It should be noted that the templates are pixels bordering the previously coded blocks, thus they appear in the diagrams as an inverted L shape. To assure that the templates shown in the figures are not viewed as underlapping square blocks, the template is shown slightly separated from its associated block, wherein its shape is clearly seen. However, in practice it is most preferable that the pixels directly border the associated block without any gap.

The present template matching method is configured to provide enhanced performance while being utilized either independently or in combination with current codec modes, such as within an H.264/AVC codec. Before proceeding to discuss the process, the following describes block sizes, template shape and size, and search region.

The apparatus and method of the present invention can be utilized with blocks of any size 4×4, 8×8, 16×16 as well as configured for use with sub-block quantities and the like, or even at a pixel level, depending on application. The method is amenable for use with adaptive block sizes.

The template can be defined in any desired shape insofar as it comprises previously resolved pixels in the region. In view of a presumed top-to-bottom and left-to-right scanning order, a preferred template shape comprises adjacent pixels above and to the left of the current block. By way of example, and not limitation, on a 2×2 block the template may comprise two top pixels, two left pixels and a corner pixel. The template size can be kept at a predetermined size or adjusted according to the invention in response to the block size.

The search neighborhood 14 is defined as the frame, or more preferably a pixel range within the frame in relation to the position of the current block, such as constrained to within certain X and Y pixel distances from the current block. It has already been noted that since the template 20 and decoded search area 14 for the current pixel/block 18 are known at both the encoder and the decoder, no additional side information needs to be transmitted to the decoder in making the same predictions as made at the encoder. Thus, both the encoder and decoder are able to find the same best match and prediction, wherein the prediction itself need not be sent to the decoder, thereby reducing bit rate and increasing compression ratio.

The following describes an example implementation of the intra-prediction process according to the invention. As a first step, a search is performed in the pixel neighborhood wherein the template associated with the current pixel block is compared to templates associated with candidate predictor blocks. A pre-determined preferred range for the search may be configured in relation to the block size that is shared between the encoder and decoder. Typically areas closer to the current block are preferred, as such smaller neighborhoods are preferable, but this may need to be increased depending on the frame resolution for larger size images. In response to detecting a sufficient level of matching between the current template and a template associated with the blocks of the search region, a template candidate is saved. The sufficient level of matching is determined in response to checking the error between the candidate template and the template for the current block, such as in terms of least residual energy (MSE, SAD or SSD, and so forth) for the comparison. During the matching process only the best candidate matches are retained. The number of allowable candidate matches is preferably predetermined for a given video configuration, although it may be less preferably established in response to characteristics of the video utilized, or the specific conditions detected within that segment of video. To simplify description, the following example recites the number of allowable candidates as four. It should be noted that the higher the number of allowable candidates, the higher the number of bits necessary for encoding the selection, which is discussed later, while the lower the number of candidates the less optimum will be the resultant prediction. Preferred values for the number of allowable candidates range from two to thirty-two, with a most preferred range of four to eight.

Figure 2:
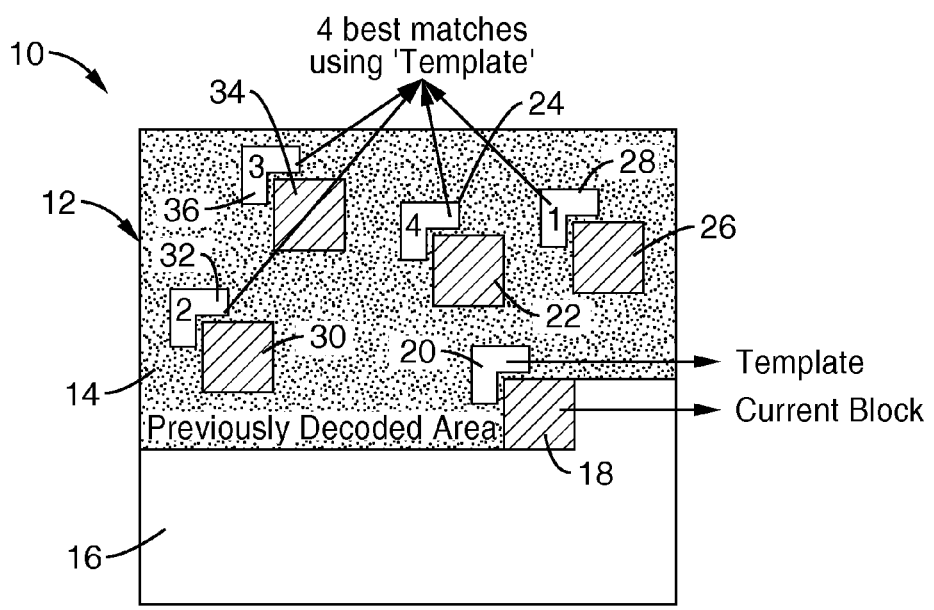
FIG. 2 is a macroblock grid showing the determination of a number of best template matches for the current block and the ordering of N best matches found within this previously coded area, according to an aspect of the present invention.

FIG. 2 illustrates an example embodiment 10 showing a pixel region 12 in which the template matching search, for template 20 with associated block 18, has determined and stored information about four of the best candidate matches, specifically template 24 ($4^{th}$ match) associated with block 22, template 28 ($1^{st}$ match) associated with block 26, template 32 ($2^{nd}$ match) associated with block 30, and template 36 ($3^{rd}$ match) associated with block 34. In a preferred implementation, these matches are sorted in a specific order, such as according to an increasing order of residual energy, which means that the first template in the list provides the best match followed in succession by the other template candidates in the list. It should be noted that matching of each respective template does not assure that the associated block will be fully matched with that of the current block. However, since some spatial correlation between the template and its associated block exists there is a high probability of similarity, and ergo a high probability of a small residual. The process up to this point is duplicated in both the encoder and decoder, wherein the decoder can use the same information and determine the same ordered list of candidates as did the encoder.

The following describes processing within the encoder, which departs from that of decoder, toward determining which of the blocks, associated with the ordered list of candidate template matches, is really the best fit with the current block being predicted, therein optimizing prediction.

Figure 3:
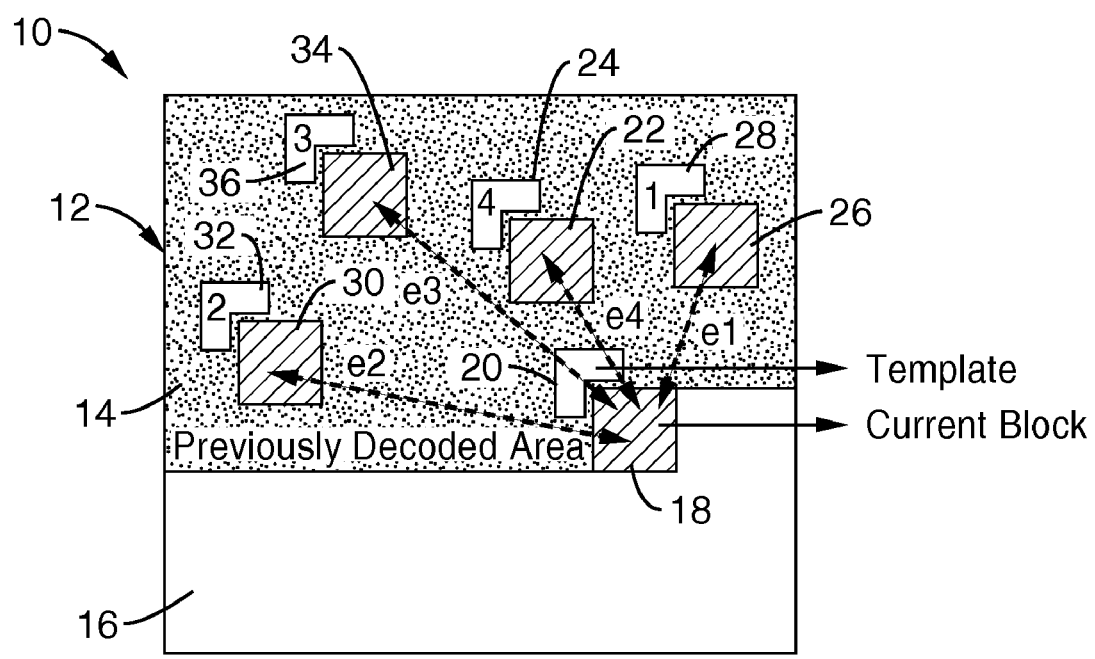
FIG. 3 is a macroblock grid showing residual energy (error) calculations between the blocks associated with each of the best matches and the actual current block to determine which of the N best template matches are to be communicated to the decoder within a selector, according to an aspect of the present invention.

FIG. 3 illustrates an embodiment 10 showing the same candidate matches from FIG. 2. In this step depicted in FIG. 3 calculation of residual energy values is performed for the actual current block 18 shown in FIG. 2. After obtaining one or more candidate matches, the second step of the method utilizes the actual pixel values in the current block which are only available to the encoder as they require access to the uncompressed block information. The actual pixel values are used to determine an error value, such as a residual energy value between the current block and the block associated with each candidate template within the list of best matches, which is shown in the figure by the dashed lines. It should be appreciated that one needs to find error to obtain the actual values back at the decoder. As a result of this process, residual energy values e1, e2, e3 and e4 are obtained by using MSE, SAD or any other suitable error criterion.

The third step, involves choosing the block that provided the least predictive error for the current block from among the available candidates. In the current example, four residual energy value candidates are available given as e1, e2, e3 and e4. According to this step, if value e3 provided the least error between block 34 in relation to the actual current block 18 than found in any of the other candidates, then the associated template 36 ($3^{rd}$ match) is chosen according to the invention as the best template match (i.e., optimized toward generating the smallest residual). This template selection from within the candidates, which will be known to the decoder, must then be communicated to the decoder. It should be appreciated that the decoder clearly has no means for determining the "actual" least predictive error in relation to the current block, as it obviously does not have access to the uncompressed video and thus the actual current block. In view of this lack of decoder ability, other previous approaches have consigned the decoder to operate on its own, so to speak, to either select the single best template match or make a prediction based on an average across multiple candidate predictions, neither of these approached requiring any additional information to be received from the encoder. In contrast to this, the decoder in the present invention relies on information received from the encoder to select the best prediction block from among these candidates, wherein it is assured to have the benefit of a best match of the actual block, and not simply of a template which has a high probability of correlating with the actual block.

According to a preferred decoder embodiment, the presence or absence of a selector value is recognized by the programming, wherein the decoder can revert to utilizing a single match or other less preferred encoding formats in response to the compressed data being received. In this way a decoder can be configured as being backward compatible from the present encoding method back to previous forms of encoding, and it can therefore decode a wider range of compressed video.

In one implementation of the present embodiment, a predetermined number of best candidate matches is retained, the example of four has been chosen herein, wherein the decoder can independently find the same four best candidates on its side of the codec and orders (sorts) these candidates accordingly. After sorting, the decoder makes a selection from the list in response to the selector provided from the encoder which points to the template having the least predictive error based on the actual current block. The information from the encoder can be communicated in a number of alternative ways.

One mechanism for signaling the selection is the choice of a simple bit flag mechanism, such as one in which a two-bit flag allows communicating which of the four possible candidates are to be selected. The size of the flag is determined in response to the number of candidates, such as a two-bit flag for a choice between four candidates, a three-bit flag for a choice between eight candidates, and so forth. The decoder can use this selector mechanism, for example, to select template 36 ($3^{rd}$ match) for completing the intra-predictions of the current block.

In another mode, the signal can be encoded differentially using a prediction by the median of the selector signal of the neighboring blocks similar to the manner the current motion vector differences in H.264/AVC are encoded, if they have also been coded using the same technique (e.g., as is traditionally performed to code motion vector information in standards such as AVC, and the like.)

Figure 4:
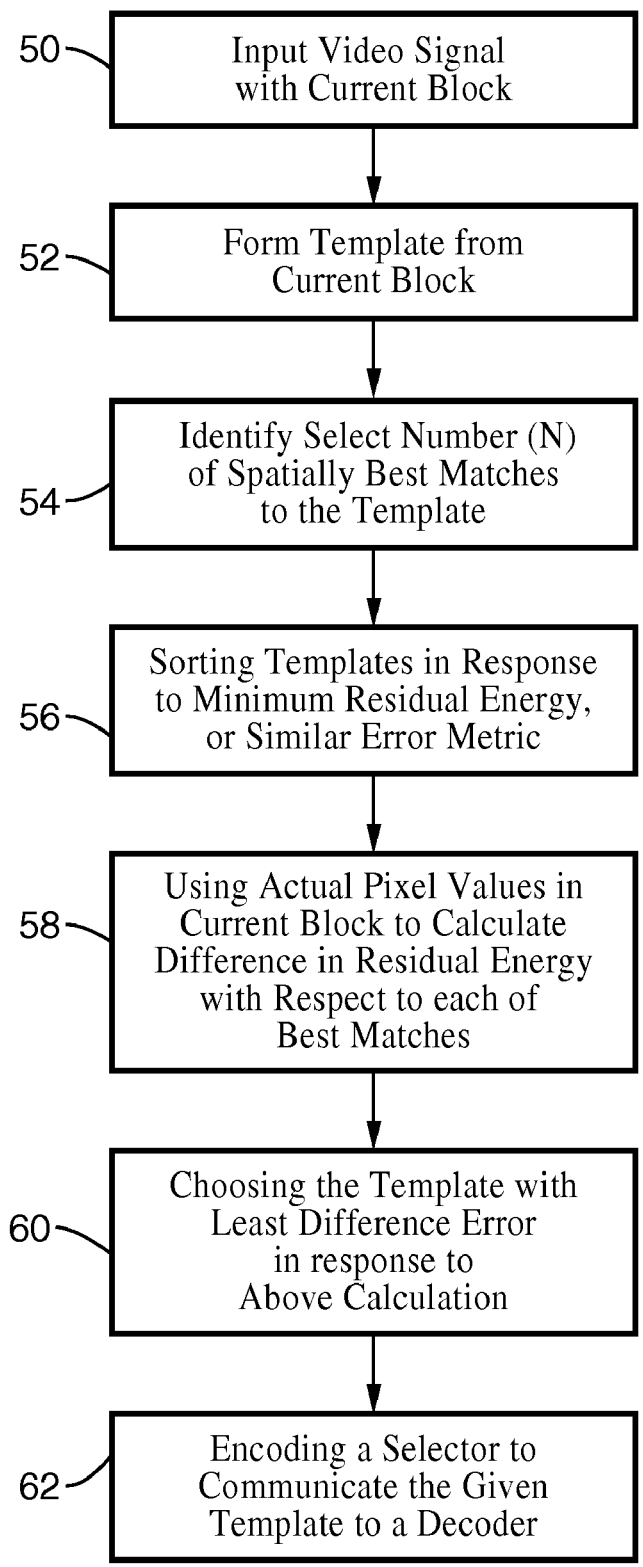
FIG. 4 is a flowchart of general intra-prediction encoding according to an embodiment of the present invention.

FIG. 4 illustrates an example embodiment of video encoding using a template matching process. In referring to the flow diagrams the term "step" will be used in referring to each flowchart "block" of the figure, so as to minimize confusion with the description of pixel blocks upon which video operations are performed. It should be appreciated that variations in the specific steps or sequences can be implemented by one of ordinary skill in the art without departing from the teachings of the present invention.

Represented by step 50, the current block of the video signal is processed and in step 52 a template is formed (technically the pixels of the template already exist, but are selected for use as a template in any desired manner) for use in searching the neighborhood of blocks. As shown in step 54 a select number (N) of spatially best matches for the template of the current block are identified within the pixel neighborhood. In step 56 these candidates are sorted in response to minimum residual energy, or a similar error metric. In step 58 pixel values from the actual current block (uncompressed video signal) are used to determine actual predictive error with respect to the blocks associated with each of these best candidate template matches. The template with the least actual predictive error in response to the above calculation is selected in step 60, and in step 62 a selector is encoded to be communicated to the decoder, indicating which template is to be selected in predicting the current block.

Figure 5:
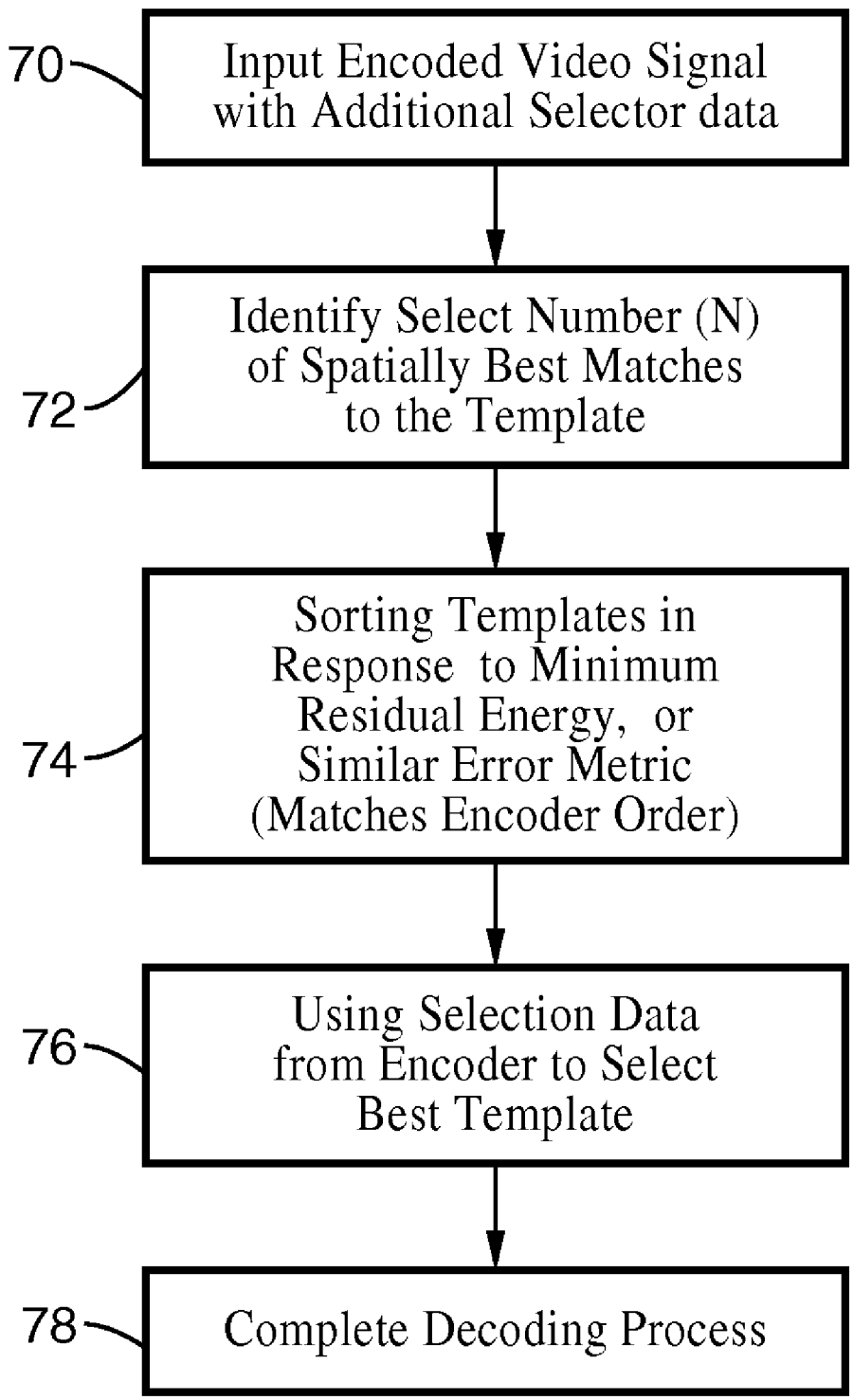
FIG. 5 is a flowchart of general intra-prediction decoding according to an embodiment of the present invention.

FIG. 5 illustrates an example embodiment of video decoding using the template matching information passed from the encoding process. It will be appreciated that steps 70-74 in FIG. 5 generally describe the same listing of best candidate matches process as shown in steps 50-56 of FIG. 4. In step 70 encoded video is input along with the additional selector data described from the encoding process of FIG. 4. The decoder finds multiple candidates matches to the current template and in step 72 a select number (N) of spatially best matches to the template are selected. In step 74 these templates are sorted in response to an error criterion, preferably minimum residual energy, or similar error metric. It will be noted that the sort order in the decoder will inherently match the sort order determined by the encoder, because the templates are both operating on the same already coded pixels. As a consequence of this matching sort order, only a specifier (selector value) is needed from the encoder, as seen in step 76, for the decoder to definitively select the optimum least predictive error match for the current block, and then to complete prediction as per step 78, and the remainder of the decoding process which is not shown.

Figure 6:
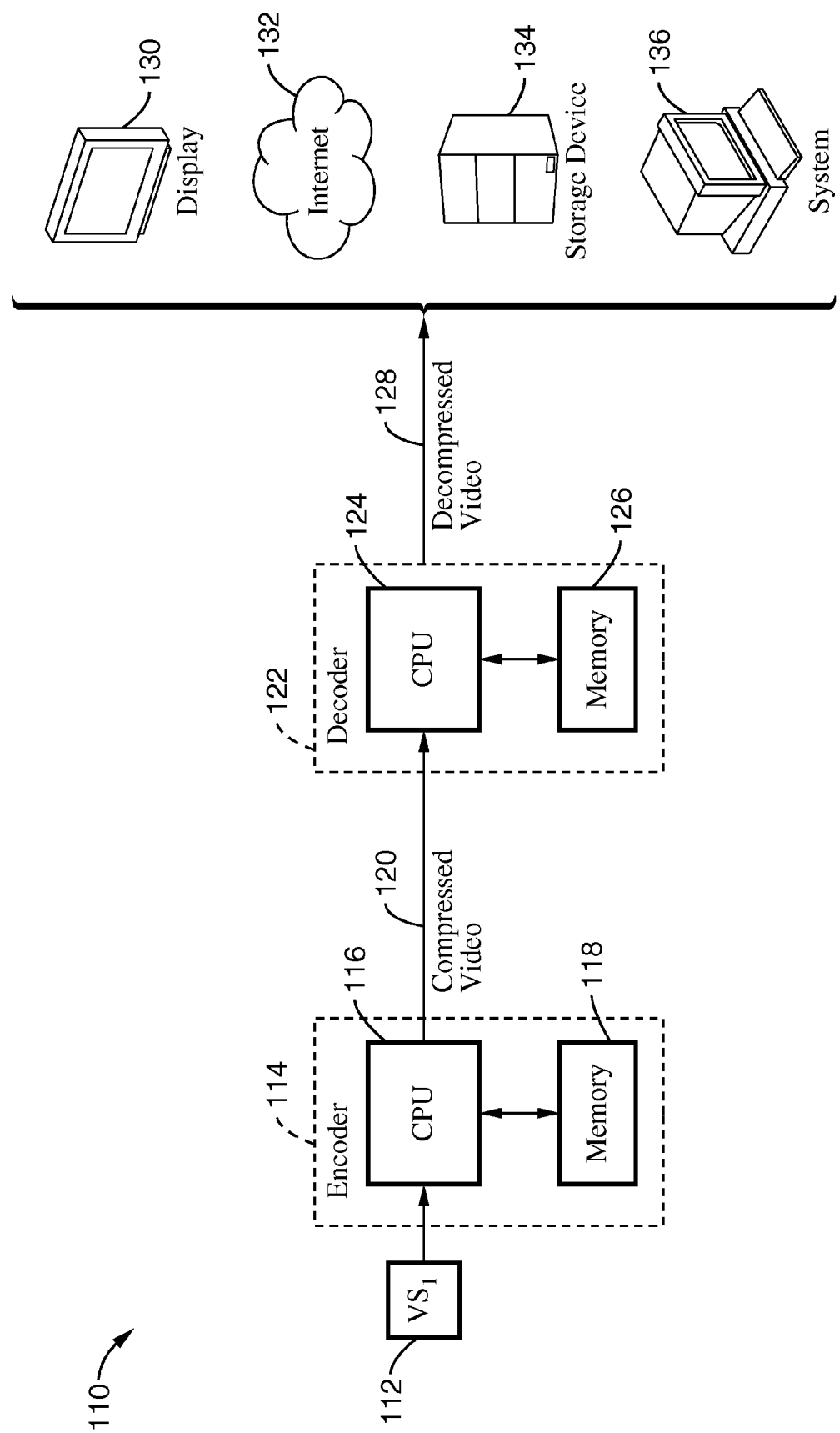
FIG. 6 is a block diagram of a video system, containing both an encoder and decoder, according to the present invention.

FIG. 6 illustrates an implementation of the present invention in the context of a computer processor enabled device 110. A video source 112 is received by an encoder 114 (depicted as surrounded by dashed lines) containing at least one computer processing element 116 (e.g., CPU, microprocessor, DSP, ASIC containing at least one processor core, and so forth) which has access to at least one memory 118.

It should be appreciated that memory 118 can comprise any desired form(s) of memory, and combinations thereof, into which executable instructions may be received for processing by computer 116, such as internal semiconductor memory (e.g., static random-access memory (SRAM), dynamic random-access memory (DRAM), FLASH, read-only memory (ROM), and other forms of digital memory), as well as receiving information from external memory sources including semiconductor memories, media devices, and so forth.

Instructions are executed from memory 118 by CPU 116 for performing the encoding method according to the present invention, such as described by the flowchart of FIG. 4. A compressed video output 120 (or less preferably outputs as desired) is generated which includes the additional best fit template selection data (e.g., two additional bits per block). Signal 120 can be stored, communicated over a network, or used in any manner that conventionally compressed video (or images) are handled.

At some point in time the compressed video is received by a decoder 122 (depicted as surrounded by dashed lines). The decoder similarly contains at least one computer processing element 124 (e.g., CPU, microprocessor, DSP, ASIC containing a processor core, and so forth) which has access to at least one memory 126. Instructions are executed from the memory by CPU 124 for performing the decoding method according to the present invention, such as described by the flowchart of FIG. 5.

An output 128 is generated from decoder 122 which comprises a decompressed video signal which can be utilized in a large number of applications, such as relating to display output 130, communication 132 (e.g., over the Internet), storage 134, and within a variety of video enabled systems 136, which are shown by way of example and not limitation. It will therefore be appreciated that the present invention may be integrated within, or applied to, a number of different applications, or application areas, in which video (images) are encoded using template matching intra-prediction and subsequent decoding.

The present invention provides improved decoder performance by communicating optimum candidate selection to the decoder, and provides numerous advantages over techniques in which the decoder must average or otherwise make use of the decoder side candidates without the benefit of foreknowledge from the encoder.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of encoding intra-predictions of a current block of a current frame of a video sequence, comprising:
identifying and sorting into an ordered list a select number (N) of spatially best matches to a matching template for the current block within previously coded and reconstructed blocks which neighbor the current block of video within an encoder;

encoding a selector which identifies which of the templates in the ordered list provides actual least predictive error between the current block and the block associated with each template within the list of best matches; and communicating the selector for receipt during a decoding process that performs the same identifying and sorting step and then selecting for use the best match in response to said selector communicated from the encoder for completing the current block prediction.

2. A method as recited in claim 1, wherein said ordered list is sorted in response to the level of least residual energy values for the given template using the associated block for each match with the current block.

3. A method as recited in claim 1, wherein the select number (N) of spatially best matches is predetermined for the encoder and decoder within a given application.

4. A method as recited in claim 1, wherein said selector is configured for communicating for receipt during decoding in response to being encoded within the compressed video signal being output in response to said method.

5. A method as recited in claim 1, wherein said selector is binary-coded with a value set to the position in the list of best matches from which the template with the actual least predictive error was found.

6. A method as recited in claim 1, wherein said selector comprises between 1 and 4 bits of information to select from a list containing between 2 and 16 elements.

7. A method as recited in claim 1, wherein said selector is encoded differentially in which the selector of the current block is predictively encoded using available neighborhood selector values.

8. A method as recited in claim 1, wherein said intra-prediction coding is signaled according to H.264 or AVC codec protocols.

9. A method as recited in claim 1, wherein said method is performed without the need for averaging of spatially best matches by the decoder.

10. A method of encoding intra-predictions of a current block of a current frame of a video sequence, comprising:
    identifying a select number (N) of spatially best matches to a matching template for the current block within previously coded and reconstructed blocks which neighbor the current block within a video input signal;
    sorting said best template matches in response to a level of difference into a sorted list of best template matches;
    determining actual differences between the blocks associated with each template in the sorted list of best template matches and actual pixel values in the current block;
    selecting the template from within the sorted list of best template matches which presents a least actual predictive error; and
    encoding a selector, within an encoder, which identifies the template with the least actual predictive error as selected from within the sorted list of best template matches;
    wherein said selector is configured for communication to a decoder which is configured for identifying a select number (N) of spatially best matches to a template of the current block, sorting the best matches based on least actual difference, and then selecting for use the template with the least actual predictive error as communicated from the encoder for completing the prediction of the current block.

11. A method as recited in claim 10, wherein said sorted list is sorted in response to a level of least residual energy.

12. A method as recited in claim 10, wherein the select number (N) of spatially best matches is predetermined for the encoder and decoder within a given application.

13. A method as recited in claim 10, wherein least actual difference is determined in response to minimum residual energy.

14. A method as recited in claim 10, wherein said selector is configured for communication to a decoder in response to being encoded within the compressed video signal being output in response to said method.

15. A method as recited in claim 10, wherein said selector is binary-coded with a value set to the position in the list of best matches from which the template having least actual predictive error between the sorted list of best template matches and actual values in the current block was found.

16. A method as recited in claim 10, wherein said selector is encoded differentially in which the selector of the current block is predictively encoded using available neighborhood selector values.

17. A method as recited in claim 10, wherein said intra-prediction coding is signaled according to H.264 or AVC codec protocols.

18. A method as recited in claim 10, wherein said method is performed on said encoder without the need for averaging of spatially best matches during decoding.

19. An apparatus for encoding intra-predictions of a current block of a current frame of a video sequence, comprising:
    a computer configured for processing an incoming video signal and generating a compressed video output configured for receipt by a decoder; and
    programming executable on said computer for:
    identifying and sorting into an ordered list a select number (N) of spatially best matches to a matching template for the current block within previously coded and reconstructed blocks which neighbor the current block of video within an encoder,
    encoding a selector which identifies which of the templates in the ordered list provides the actual least predictive error between the current block and the block associated with each template within the list of best matches, and
    communicating the selector for receipt during a decoding process that performs the same identifying and sorting step and then selecting for use the best match in response to said selector communicated from the encoder for completing the current block prediction.

20. A computer-readable, non-transitory, media containing a computer program executable on a computer configured for processing video signals and causing the computer to encode intra-predictions of a current block of a current frame of a video sequence, in response to steps, comprising:
    identifying and sorting into an ordered list a select number (N) of spatially best matches to a matching template for the current block within previously coded and reconstructed blocks which neighbor the current block of video;
    encoding a selector which identifies which of the templates in the ordered list provides the actual least predictive error for the current block; and
    communicating the selector for receipt during a decoding process that performs the same identifying and sorting step and then selecting for use the best match in response to said selector communicated from the encoder for completing the current block prediction.

* * * * *